(12) United States Patent
Barnett et al.

(10) Patent No.: US 11,303,803 B2
(45) Date of Patent: Apr. 12, 2022

(54) SYSTEMS AND METHODS FOR PRESENTING CONTENT BASED ON UNSTRUCTURED VISUAL DATA

(71) Applicant: Meta Platforms, Inc., Menlo Park, CA (US)

(72) Inventors: John Samuel Barnett, Newark, CA (US); William Samuel Bailey, San Francisco, CA (US); Cheng Huang, New York, NY (US); Joshua Li, San Jose, CA (US); Alexander Dauning Li, Los Altos, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 162 days.

(21) Appl. No.: 16/391,214

(22) Filed: Apr. 22, 2019

(65) Prior Publication Data

US 2019/0253616 A1    Aug. 15, 2019

Related U.S. Application Data

(63) Continuation of application No. 15/393,014, filed on Dec. 28, 2016, now Pat. No. 10,298,837.

(51) Int. Cl.
*H04N 5/222* (2006.01)
*H04N 5/232* (2006.01)
*H04L 67/02* (2022.01)
*G06K 9/00* (2022.01)
*G06K 9/62* (2022.01)
*H04L 67/50* (2022.01)
*H04L 67/52* (2022.01)

(52) U.S. Cl.
CPC ..... *H04N 5/23222* (2013.01); *G06K 9/00671* (2013.01); *G06K 9/62* (2013.01); *H04L 67/02* (2013.01); *H04L 67/18* (2013.01); *H04L 67/22* (2013.01); *H04N 5/232939* (2018.08)

(58) Field of Classification Search
CPC .................................................. H04N 5/23222
USPC ..................................................... 348/333.02
See application file for complete search history.

(56) References Cited

U.S. PATENT DOCUMENTS

| | | | |
|---|---|---|---|
| 6,411,724 B1 | 6/2002 | Vaithilingam |
| 7,428,529 B2 | 9/2008 | Zeng |
| 8,056,019 B2 | 11/2011 | Borchardt |
| 8,402,395 B2 | 3/2013 | Borchardt |

(Continued)

OTHER PUBLICATIONS

Hughes, Mark et al., "A Machine Learning Approach to Determining Tag Relevance in Geotagged Flickr Imagery," 2012 13th International Workshop on Image Analysis for Multimedia Interactive Services (WIAMIS), May 23, 2012.

(Continued)

*Primary Examiner* — Usman A Khan
(74) *Attorney, Agent, or Firm* — Sheppard Mullin Richter & Hampton LLP

(57) ABSTRACT

Systems, methods, and non-transitory computer-readable media can receive a plurality of content items. Tag information is generated for each content item of the plurality of content items. The tag information comprises one or more tags, and at least one tag for each content item is generated based on a machine learning technique. Query information is received from a first user. One or more content items of the plurality of content items is identified based on the query information and the tag information.

20 Claims, 7 Drawing Sheets

(56) References Cited

U.S. PATENT DOCUMENTS

| | | | |
|---|---|---|---|
| 8,682,819 B2 | 3/2014 | Consul | |
| 8,788,498 B2 | 7/2014 | Kannan | |
| 8,805,110 B2 | 8/2014 | Rhoads | |
| 8,836,538 B2* | 9/2014 | Ma | B60R 1/00 |
| | | | 340/932.2 |
| 9,330,167 B1 | 5/2016 | Pendar | |
| 10,109,051 B1 | 10/2018 | Natesh | |
| 10,255,244 B2 | 4/2019 | Brewer | |
| 2004/0088325 A1 | 5/2004 | Elder et al. | |
| 2009/0164929 A1 | 6/2009 | Chen et al. | |
| 2009/0171568 A1 | 7/2009 | McQuaide, Jr. | |
| 2009/0197681 A1 | 8/2009 | Krishnamoorthy et al. | |
| 2009/0228296 A1 | 9/2009 | Ismalon | |
| 2010/0123737 A1 | 5/2010 | Williamson | |
| 2010/0328344 A1 | 12/2010 | Mattila | |
| 2011/0029474 A1 | 2/2011 | Lin | |
| 2011/0050909 A1* | 3/2011 | Ellenby | G03B 17/24 |
| | | | 348/207.1 |
| 2011/0141141 A1 | 6/2011 | Kankainen | |
| 2011/0164163 A1 | 7/2011 | Bilbrey | |
| 2012/0310926 A1 | 12/2012 | Gannu et al. | |
| 2013/0041876 A1 | 2/2013 | Dow et al. | |
| 2013/0086057 A1 | 4/2013 | Harrington et al. | |
| 2013/0202154 A1* | 8/2013 | Hirano | H04N 13/221 |
| | | | 382/103 |
| 2013/0275536 A1 | 10/2013 | Murdock et al. | |
| 2014/0126028 A1 | 5/2014 | Kim | |
| 2014/0254934 A1 | 9/2014 | Bhat et al. | |
| 2014/0258280 A1 | 9/2014 | Wilson | |
| 2014/0279860 A1 | 9/2014 | Pan | |
| 2015/0036939 A1 | 2/2015 | Cordara | |
| 2015/0046446 A1 | 2/2015 | Gannu et al. | |
| 2015/0178592 A1* | 6/2015 | Ratcliff | H04N 5/23293 |
| | | | 382/155 |
| 2015/0294221 A1 | 10/2015 | Andres Gutierrez | |
| 2016/0189425 A1 | 6/2016 | Li | |
| 2016/0232678 A1 | 8/2016 | Kurz | |
| 2017/0097948 A1 | 4/2017 | Kerr et al. | |
| 2017/0351713 A1 | 12/2017 | Chamberlain et al. | |
| 2018/0096202 A1* | 4/2018 | Stathacopoulos | G06F 1/1694 |

OTHER PUBLICATIONS

Jiang, Lixing et al., "Automatic Image Annotation Based on Decision Tree Machine Learning," 2009 International Conference on Cyber-Enabled Distributed Computing and Knowledge Discovery, pp. 170-175, Oct. 10, 2009.

Lin, Kevin et al., "Deep Learning of Binary Hash Codes for Fast Image Retrieval," Proceedings of the IEEE Conference on Computer Vision and Pattern Recognition Workshops (CVPRW), Jun. 7, 2015.

Mansuri, Imran R. et al., "Integrating Unstructured Data into Relational Databases," 22nd International Conference on Data Engineering (ICDE'06), p. 29, Apr. 2006.

Michelson, Matthew et al., "Creating Relational Data from Unstructured and Ungrammatical Data Sources," Journal of Artificial Intelligence Research, vol. 31, No. 1, pp. 543-590, Jan. 2008.

Murthy, Venkatesh N. et al., "Automatic Image Annotation Using Deep Learning Representations," Proceedings of the 5th ACM International Conference on Multimedia Retrieval (ICMR '15), pp. 603-606, Jun. 23, 2015.

Rusu, Octavian et al., "Converting Unstructured and Semi-structured Data into Knowledge," 2013 11th RoEduNet International Conference, Jan. 2013.

\* cited by examiner

SYSTEMS AND METHODS FOR PRESENTING CONTENT BASED ON UNSTRUCTURED VISUAL DATA

CROSS-REFERENCE TO RELATED APPLICATIONS

This application is a continuation of U.S. patent application Ser. No. 15/393,014, filed on Dec. 28, 2016 and entitled "SYSTEMS AND METHODS FOR PRESENTING CONTENT BASED ON UNSTRUCTURED VISUAL DATA", which is incorporated herein by reference in its entirety.

FIELD OF THE INVENTION

The present technology relates to the field of content provision. More particularly, the present technology relates to techniques for presenting content based on unstructured visual data.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems may have access to significant amounts of data. For example, a social networking system may have access to data about users on the social networking system, content posted to the social networking system, and user interactions with content posted to the social networking system. User experience associated with a social networking system can be enhanced using data available to the social networking system. When knowledge of users and content on the social networking system is gained, features, tools, and other services can be optimized for presentation to users. Improved features and tools can be offered to increase user interest in and engagement with the social networking system.

SUMMARY

Various embodiments of the present disclosure can include systems, methods, and non-transitory computer readable media configured to receive a plurality of content items. Tag information is generated for each content item of the plurality of content items. The tag information comprises one or more tags, and at least one tag for each content item is generated based on a machine learning technique. Query information is received from a first user. One or more content items of the plurality of content items is identified based on the query information and the tag information.

In an embodiment, recommendations are presented based on the identifying one or more content items.

In an embodiment, the query information comprises visual information from a camera application.

In an embodiment, the presenting recommendations comprises presenting the recommendations in an augmented reality interface of the camera application.

In an embodiment, the presenting recommendations comprises presenting at least a subset of the one or more content items.

In an embodiment, the presenting recommendations further comprises presenting textual information associated with the at least the subset of the one or more content items.

In an embodiment, the textual information comprises at least one of: captions or comments associated with the at least the subset of the one or more content items.

In an embodiment, the query information comprises a place of interest query for a particular location, and the recommendations comprise place of interest recommendations.

In an embodiment, the places of interest recommendations are presented in a map view, and one or more content items are presented for each place of interest recommendation.

In an embodiment, the query information comprises user location information, and the identifying one or more content items comprises identifying one or more content items comprising location tag information that matches the user location information.

Various embodiments of the present disclosure can include systems, methods, and non-transitory computer readable media configured to identify a previous content item for re-creation. Location guidance is presented to direct a first user to a location associated with the previous content item. Camera orientation guidance is presented.

In an embodiment, the presenting location guidance comprises presenting the location guidance in an augmented reality interface of a camera application.

In an embodiment, the presenting camera orientation guidance comprises presenting the camera orientation guidance in an augmented reality interface of a camera application.

In an embodiment, the presenting the camera orientation guidance comprises presenting a semi-transparent view of the previous content item in the camera application.

In an embodiment, one or more potential re-creation recommendations are presented.

In an embodiment, the one or more potential re-creation recommendations are determined based on social networking system activity by the first user.

In an embodiment, the one or more potential re-creation recommendations are determined based on previous content items liked by the first user on the social networking system.

In an embodiment, the one or more potential re-creation recommendations are determined based on user location information associated with the first user.

In an embodiment, each potential re-creation recommendation of the one or more potential re-creation recommendations is associated with a particular location, and each potential re-creation recommendation of the one or more potential re-creation recommendations is selected based on a number of content items associated with the particular location associated with the potential re-creation recommendation.

In an embodiment, the identifying the previous content item comprises receiving a selection of a potential re-creation recommendation of the one or more potential re-creation recommendations.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods

Figure 1:
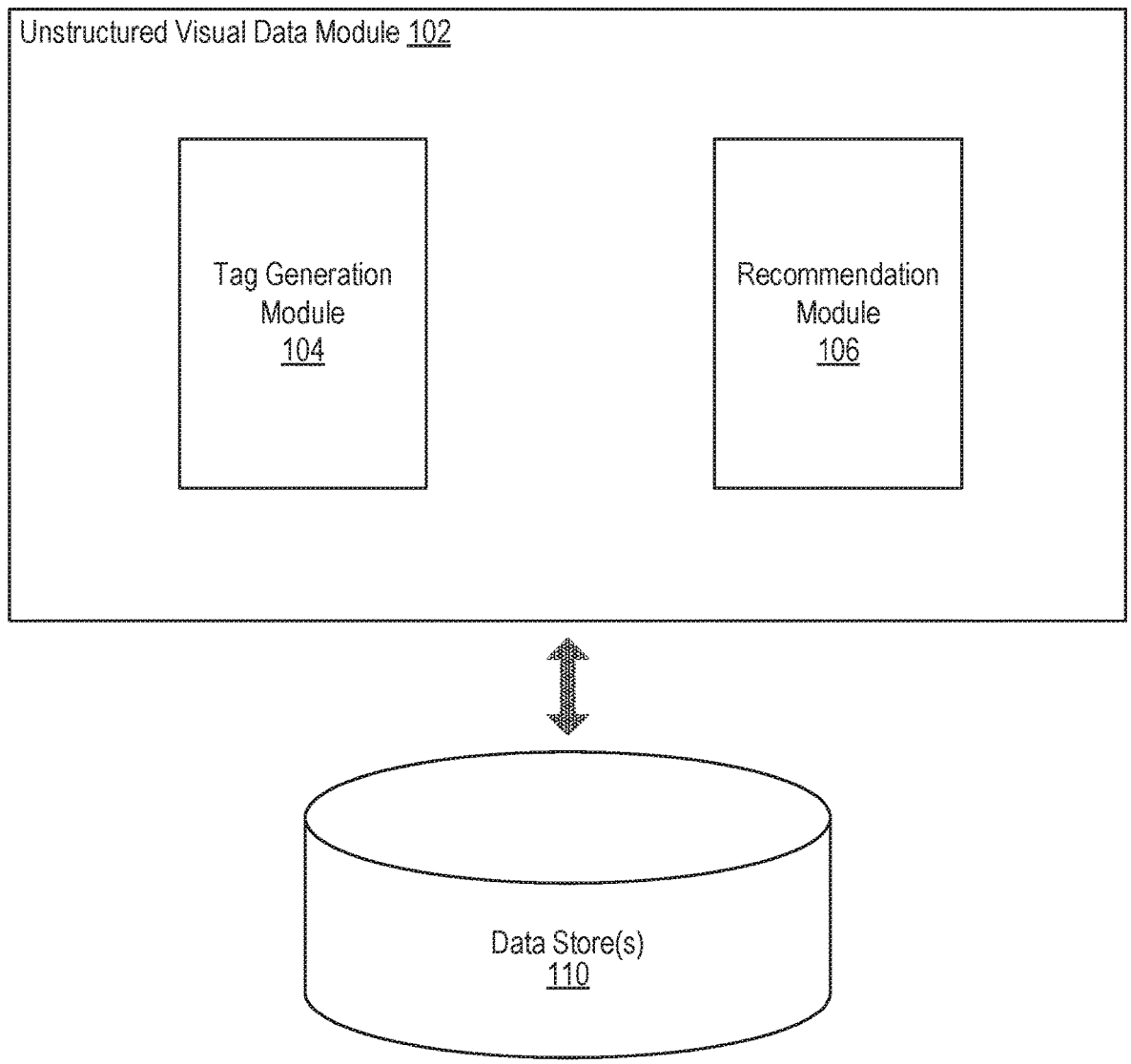
FIG. 1 illustrates an example system including an unstructured visual data module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Presenting Content Based on Unstructured Visual Data

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Social networking systems may have access to significant amounts of data. For example, a social networking system may have access to data about users on the social networking system, content posted to the social networking system, and user interactions with content posted to the social networking system. User experience associated with a social networking system can be enhanced using data available to the social networking system. When knowledge of users and content on the social networking system is gained, tools, features, and other services can be optimized for presentation to users. Improved features and tools can be offered to increase user interest in and engagement with the social networking system.

It continues to be an important interest for a social networking system rooted in computer technology to make use of available data to provide features and tools that are of interest to users. However, it can be difficult to effectively utilize data that is available to a social networking system. This is particularly true given the massive amounts of data that may be available to a social networking system. This difficulty in effectively utilizing available data may be further exacerbated by the fact that large amounts of data are available in forms that are not easily accessible or easily utilized. For example, data may be available in unstructured formats that are not easily provided to, or utilized by, automated systems.

An improved approach rooted in computer technology overcomes the foregoing and other disadvantages associated with conventional approaches specifically arising in the realm of computer technology. In some embodiments, unstructured data associated with content items, such as images or videos posted to a social networking system, can be converted into structured tags associated with the content items. In certain embodiments, tags may be generated based on object recognition. Object recognition can be utilized to recognize one or more objects depicted in a content item, and to tag the content item with tag information associated with the one or more objects. In various embodiments, tags may also be generated based on textual information associated with a content item. Textual information associated with a content item can include, for example, a caption associated with the content item and/or comments associated with the content item. In various embodiments, tags may be generated based on location information associated with a content item. Location information can include, for example, information indicative of where the content item was captured (e.g., a geotag). Tag information associated with content items can be utilized to provide various features to users. For example, in certain embodiments, users can be presented with various recommendations based on tags. Recommendations can be presented based on query information provided by a user. Recommendations can include, for example, product reviews, restaurant recommendations, travel guides, location-specific recommendations, image re-creation guidance, and the like.

By converting unstructured visual data into structured tags, the systems and methods provided herein are able to provide users with useful information based on unstructured visual data. Consider the example scenario of a user on a social networking system posting an image of a cup of coffee from ABC Coffee Shop in Berkeley, Calif. with the caption "This is so good." Under conventional approaches, the user's opinion of the coffee or the coffee shop may not have been available to other users on the social networking system unless those users specifically saw the user's content item. However, under the disclosed systems and methods, the content item (i.e., the image of the cup of coffee) can be tagged with object information (e.g., coffee), location information (e.g., the coffee shop's name, address, city, etc.), and text-based sentiment information ("so good"). These structured tags can then be used to benefit other users on the social networking system. For example, if a second user searches for "coffee shops in Berkeley, Calif.," the tags associated with the content item can be used to surface the content item and ABC Coffee Shop to the second user. As such, the conversion of unstructured visual data into structured tags allows for utilization of visual data in responding to user queries and/or making recommendations to users, as will be described in greater detail herein.

FIG. 1 illustrates an example system 100 including an example unstructured visual data module 102, according to an embodiment of the present disclosure. The unstructured visual data module 102 can be configured to generate tags for content items. In various embodiments, content items can include visual or multimedia content items comprising a visual element (e.g., an image, a video, etc.). Tags for a content item may be generated based on any available information associated with the content item. For example, tags may be generated based on object recognition such that a content item is tagged with objects depicted in the content item. Tags may also be generated based on textual information associated with a content item (e.g., captions and/or comments). Tags may also be generated based on location information associated with a content item (e.g., geotag information). Tags can be used to associate a content item with various concepts, e.g., people, places, or things. For example, a content item that is an image of a landmark can be tagged with, and, thereby associated with, the landmark and the location of the landmark.

The unstructured visual data module 102 can be further configured to provide recommendations based on tag information. In certain embodiments, users can request information and/or recommendations by providing query information. Query information can be provided in various forms. For example, a user can enter a textual search query, e.g., for a specific product, or retailer, or location. In this case, a user can be presented with a collection of content items that match the user's textual search query. In another example, a user can open an application on his or her mobile device that provides recommendations based on the user's current location. In a more specific implementation, a user can open a camera application on his or her mobile device and view his or her surroundings within the camera application using a camera on the mobile device. As the user is viewing his or her surroundings on the mobile device, the user may be presented with an augmented reality experience in which the user is provided with content items based on the user's current location. For example, if a user views a particular product (e.g., a shirt) using a camera application, content items that have been tagged with tag information related to the product can be presented to the user. For example, the content items can include images of other users of a social networking system wearing the shirt or a similar shirt. The user can view these content items that have been posted by the other users of the social networking system to see how the shirt looks on other people, and can also look at comments from other users on these content items to help inform the user's purchasing decision. In yet another example, if a user is traveling in a foreign city, and opens the camera application to view the user's surroundings, content items can be presented that reflect popular locations near the user, e.g., locations from which other users frequently post content items.

As shown in the example of FIG. 1, the unstructured visual data module 102 can include a tag generation module 104 and a recommendation module 106. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the unstructured visual data module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the unstructured visual data module 102 can be implemented, in part or in whole, as software running on one or more computing devices or systems, such as on a user or client computing device. In one example, the unstructured visual data module 102 or at least a portion thereof can be implemented as or within an application (e.g., app), a program, or an applet, etc., running on a user computing device or a client computing system, such as the user device 610 of FIG. 6. In another example, the unstructured visual data module 102 or at least a portion thereof can be implemented using one or more computing devices or systems that include one or more servers, such as network servers or cloud servers. In some instances, the unstructured visual data module 102 can, in part or in whole, be implemented within or configured to operate in conjunction with a social networking system (or service), such as the social networking system 630 of FIG. 6.

The unstructured visual data module 102 can be configured to communicate and/or operate with the at least one data store 110, as shown in the example system 100. The at least one data store 110 can be configured to store and maintain various types of data. For example, the data store 110 can store information describing various content that has been posted by users of a social networking system. In some implementations, the at least one data store 110 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some embodiments, the data store 110 can store information that is utilized by the unstructured visual data module 102. For example, the data store 110 can store content item information, object recognition machine learning models, tag information, location data, and the like. It is contemplated that there can be many variations or other possibilities.

The tag generation module 104 can be configured to generate tags for content items. In certain embodiments, tags can be generated for a content item to associate the content item with various concepts, e.g., persons, places, or things. One or more tags may be generated for a content item based on any information available for the content item. For example, object recognition can be utilized to recognize one or more objects in a content item, and the content item can be associated with (or "tagged" with) tag information identifying the one or more objects. In another example, textual information associated with the content item can be used to generate tags for the content item. For example, a caption associated with the content item or one or more comments associated with the content item can be utilized to generate tags. In yet another example, location information associated with the content item can be used to generate location-based tags that associate the content item with one or more locations (e.g., an address, a geographic coordinate, a city, a state, a country, a building, etc.). Functionality of the tag generation module 104 will be described in greater detail herein with reference to FIG. 2.

The recommendation module 106 can be configured to provide recommendations based on tag information associated with content items. A user can request recommendations by providing query information. Query information can take various forms. In certain embodiments, a user can enter query information by entering a textual search query. For example, if a user searches for "summer dresses," the user may be presented with recommendations based on content items that have been tagged with "summer dresses" or a related tag (e.g., "dresses"). These recommendations can include, for example, images of summer dresses, as well as captions and/or comments on these images. Other users' captions and/or comments may be useful to the current user, as they may provide positive or negative opinions about various summer dress options and inform the current user's purchasing decisions. In this way, textual information associated with content items can be used by the current user as product reviews or to give the user a sense of other users' sentiments towards the product.

In certain embodiments, query information can include visual query information. For example, a user can use a camera, e.g., on his or her mobile device, to request recommendations based on what is captured by the camera. An example scenario of a user using visual query information to request recommendations can include a user looking for a restaurant near the user's current location. The user can use a camera application on his or her mobile device to view the user's immediate surroundings. The user's location, as well as the visual information provided by the user's camera, can be used to find content items that are associated with (e.g., tagged with) the user's current area. As the user scans his or her surroundings using the camera application, various restaurants in the user's area may come into and out of view. Content items that are associated with restaurants currently being shown in the user's camera application (as determined using tag information) can be presented to the user in an augmented reality experience. The user can view the content items and associated information (e.g., captions, comments) to make a decision as to which restaurant to dine in. In certain embodiments, recommendations can be tailored to a particular user. For example, in the example of a user looking for nearby restaurants, restaurants can be selected and/or ranked based on the user's known interests or preferences. For example, if the user has a preference for Italian restaurants, nearby Italian restaurants may be highlighted and/or up-ranked. It should be appreciated that many different types of recommendations can be made based on tag information associated with content items. Functionality of the recommendation module 106 will be described in greater detail herein with reference to FIG. 3.

Figure 2:
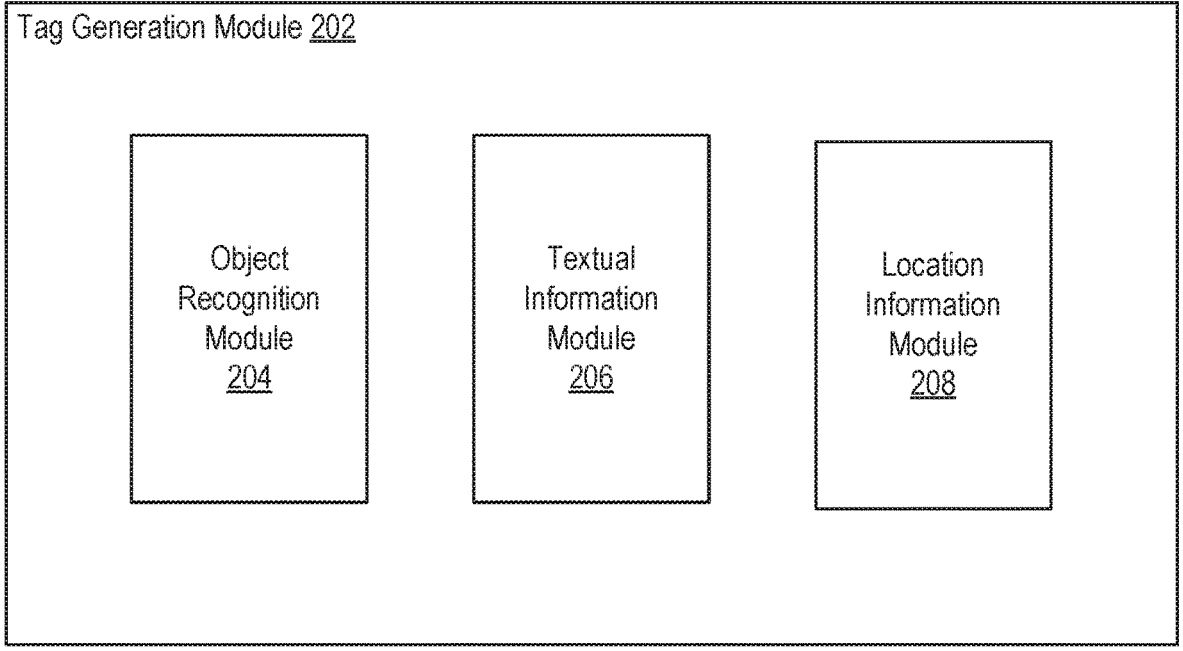
FIG. 2 illustrates an example tag generation module, according to an embodiment of the present disclosure.

FIG. 2 illustrates a tag generation module 202, according to an embodiment of the present disclosure. In some embodiments, the tag generation module 104 of FIG. 1 can be implemented as the tag generation module 202. As shown in the example of FIG. 2, the tag generation module 202 can include an object recognition module 204, a textual information module 206, and a location information module 208.

The object recognition module 204 can be configured to generate tags for a content item based on object recognition. In various embodiments, machine learning techniques can be utilized to automatically recognize objects depicted in a content item. For example, an image of an apple sitting on a table in a forest can be tagged with the objects "apple," "table," "trees," and "forest." Object tags can also include broader categorical tags, such as "fruit," "food," "furniture," etc. Tags based on object recognition need not necessarily be limited to objects, and may also include concepts. For example, the example image of an apple sitting on a table in a forest could also be tagged with the broader concepts "outdoors," "scenic," or "still life."

The textual information module 206 can be configured to generate tags for a content item based on textual information associated with the content item. In certain embodiments, textual information associated with a content item can include a caption associated with the content item and/or one or more comments associated with the content item. Based on conventional text analysis or natural language processing techniques that can be implemented with machine learning techniques, textual information associated with a content item can be used to infer certain information. For example, words indicative of positive or negative sentiment (e.g., great, fantastic, terrible, worst) can be used to assign a sentiment tag to the content item. Users that are looking for recommendations based on content item tag information can use sentiment tags to determine whether other users view a particular concept favorably or unfavorably.

The location information module 208 can be configured to generate tags for a content item based on location information associated with the content item. In certain embodiments, location information can include a geotag that is captured by a user's computing device when the user captures the content item (e.g., takes a picture or records a video). In various embodiments, users may be given the ability to manually tag a content item with a particular location. In some instances, a tag identifying a particular location can be generated based on an object detected in a content item and a determination that the particular location is associated with the object. In some instances, the location information module 208 can be implemented by a suitable machine learning technique.

In certain embodiments, various types of information can be combined to generate tags for a content item. For example, if an image depicts a shirt, and a caption for the image indicates that the shirt is made by Brand A, and location information associated with the content item indicates that the image was taken at a particular store location for Brand A, rather than (or in addition to) simply tagging the image with the object "shirt," a specific product offered by Brand A can be identified based on the available information. By combining available information sources associated with a content item, it may be possible to generate tags that have greater specificity or granularity.

Figure 3:
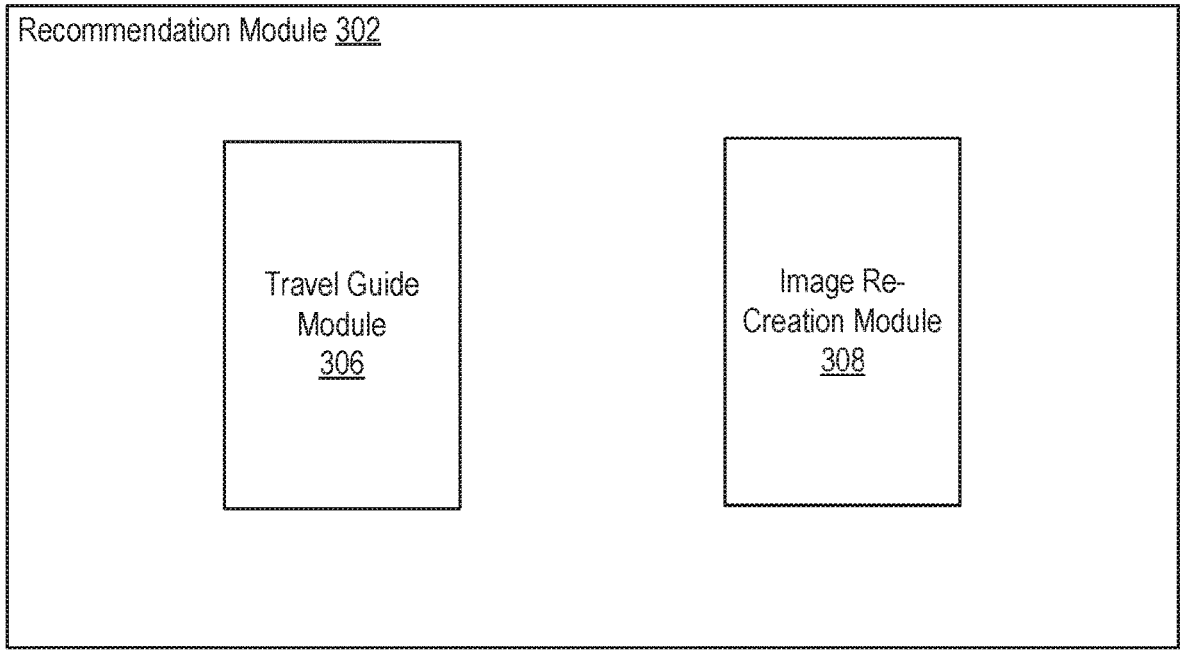
FIG. 3 illustrates an example recommendation module, according to an embodiment of the present disclosure.

FIG. 3 illustrates a recommendation module 302, according to an embodiment of the present disclosure. In some embodiments, the recommendation module 106 of FIG. 1 can be implemented as the recommendation module 302. As shown in the example of FIG. 3, the recommendation module 302 can include a travel guide module 306 and an image re-creation module 308. As discussed above, various types of recommendations can be made based on content item tag information. The modules depicted in FIG. 3 are associated with two example implementations of recommendations that can be provided based on content item tag information.

The travel guide module 306 can be configured to provide travel recommendations to a user based on content item tag information. Travel recommendations can take various forms. In certain embodiments, a user planning a trip to a particular location can perform a search for the location and receive recommendations for various places of interest associated with the location. Place of interest recommendations can be presented, for example, in a list view and/or in a map view that illustrates the location of each place of interest. Place of interest recommendations can be determined based on various selection criteria. For example, places of interest can be selected, at least in part, based on how many content items have been tagged with (i.e., are associated with) each place of interest. Each place of interest recommendation can include a set of content items that have been tagged with the place of interest. In various embodiments, travel recommendations can be customized to a particular user. For example, if a first user is seeking travel recommendations, content items that have been posted by other users that the first user follows or is connected with on a social networking system (and, therefore, places of interest associated with those content items) can be given greater weight for potential presentation than other content items. In certain embodiments, certain users on a social networking system may be identified as "experts" for a particular location, such that content items by those expert users are also given greater weight.

In certain embodiments, travel recommendations may also be provided to a user in an augmented reality recommendation interface. As mentioned above, a user may initiate an augmented reality recommendation interface by opening a camera application on his or her computing device. As the user moves the camera, the user can view different portions of the user's surroundings. Recommendations can be made for the user's immediate surroundings by presenting recommendations in the camera application. For example, if a user is looking for places of interest in the user's immediate area, the user can open up a camera application on his or her mobile device. As the user rotates the view of the camera application, places of interest can be presented within the view of the user's surroundings shown in the camera application, along with content items associated with each place of interest. In a more particular example, if a user is looking for restaurants in the user's immediate area, the user can open up a camera application on his or her mobile device. As the user views his or her surroundings using the camera application, a first restaurant, Restaurant A, may come into view. As Restaurant A is shown in the user's camera application, content items that have been tagged with Restaurant A can be shown to the user. As the user continues to rotate the camera view, a second restaurant, Restaurant B, may come into view. Again, content items that have been tagged with Restaurant B can be presented to the user. The user can use the content items and any associated information (e.g., captions, comments), to decide which restaurant to dine in.

The image re-creation module 308 can be configured to provide image re-creation recommendations and/or guidance based on content item tag information. Image re-creation recommendations and/or guidance can be provided to assist users that are interested in re-creating content items that have been previously captured by other users. For example, if a user likes a photo of the Eiffel Tower taken by another user, the user may wish to take their own photo of the Eiffel Tower that emulates the previous photo taken by the other user.

The image re-creation module 308 can be configured to identify and provide potential re-creation recommendations of content items that a user may be interested in re-creating. For example, if a user has previously liked a previous photo of the Golden Gate Bridge by User A, and the user's current location is determined to be near the location from which the previous photo was taken, the user may receive a notification, for example, on an application interface on his or her mobile device, that notifies the user that "User A took this picture of the Golden Gate Bridge from a nearby location, would you like to re-create it?" In another example, if a large number of users have captured content items from a particular location, the user can be presented with a potential re-creation recommendation indicating that a large number of users have captured content items from a nearby location. The potential re-creation recommendation can include one or more content items so that the user can see the content items that were captured from that location to determine whether or not he or she would like to re-create any of those content items.

If the user indicates that he or she would like to re-create a content item (e.g., by selecting a content item to re-create), the user can be provided with location guidance via a user interface on his or her mobile device that directs the user to the exact location from which a previous user took the previous content item. This location can be determined by location tag information associated with the content item. In certain embodiments, an augmented reality interface can depict on a camera application on the user's mobile device the precise location from which a previous content item was captured. For example, if the user is looking at the user's surroundings in the camera application, an "X" or a target can be placed on the location from which the previous content item was captured. When the user is standing at the location from which a previous content item was captured, the user may be provided with camera orientation guidance to re-create the content item. For example, the user can be instructed to move his or her mobile device higher or lower, or to adjust the angle of his or her camera. In certain embodiments, the user's camera application may present a semi-transparent overlay of the previous content item so that the user can line up the image to match that of the previous content item. While some embodiments and examples have been discussed, many variations in accordance with the present disclosure are possible.

Figure 4:
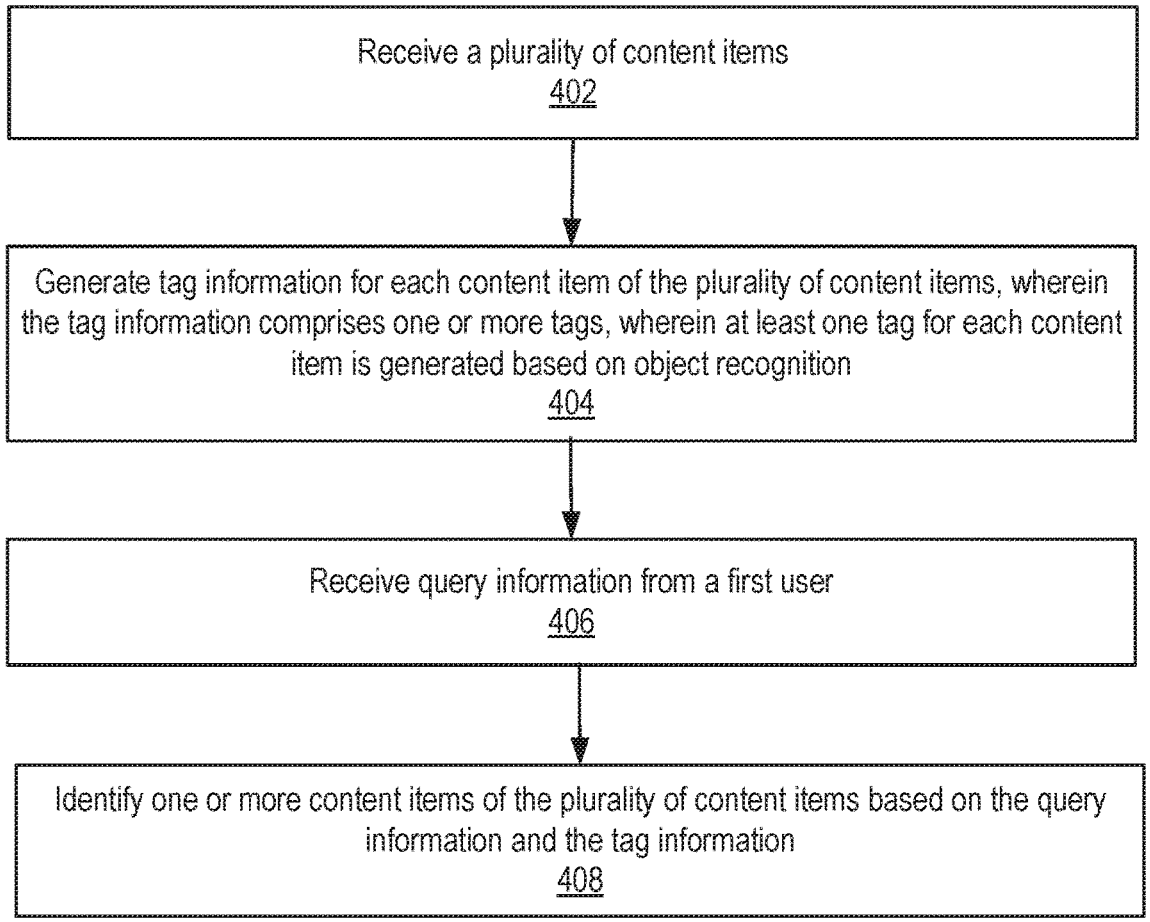
FIG. 4 illustrates an example method associated with generating recommendations based on unstructured visual data, according to an embodiment of the present disclosure.

FIG. 4 illustrates an example method 400 for generating recommendations based on unstructured visual data, according to an embodiment of the present disclosure. It should be appreciated that there can be additional, fewer, or alternative steps performed in similar or alternative orders, or in parallel, within the scope of the various embodiments discussed herein unless otherwise stated.

At block 402, the example method 400 can receive a plurality of content items. At block 404, the example method 400 can generate tag information for each content item of the plurality of content items, wherein the tag information comprises one or more tags, wherein at least one tag for each content item is generated based on object recognition. At block 406, the example method 400 can receive query information from a first user. At block 408, the example method 400 can identify one or more content items of the plurality of content items based on the query information and the tag information.

Figure 5:
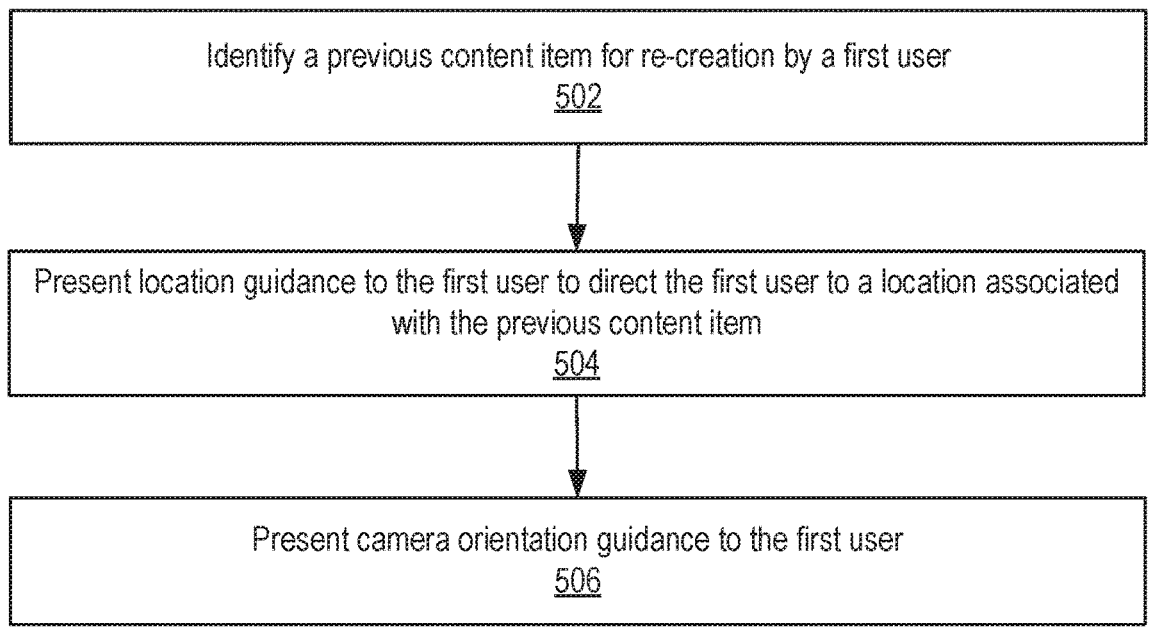
FIG. 5 illustrates an example method associated with image re-creation guidance, according to an embodiment of the present disclosure.

FIG. 5 illustrates an example method 500 for providing image re-creation guidance, according to an embodiment of the present disclosure. It should be appreciated that there can be additional, fewer, or alternative steps performed in similar or alternative orders, or in parallel, within the scope of the various embodiments discussed herein unless otherwise stated.

At block 502, the example method 500 can identify a previous content item for re-creation by a first user. At block 504, the example method 500 can present location guidance to the first user to direct the first user to a location associated with the previous content item. At block 506, the example method 500 can present camera orientation guidance to the first user.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
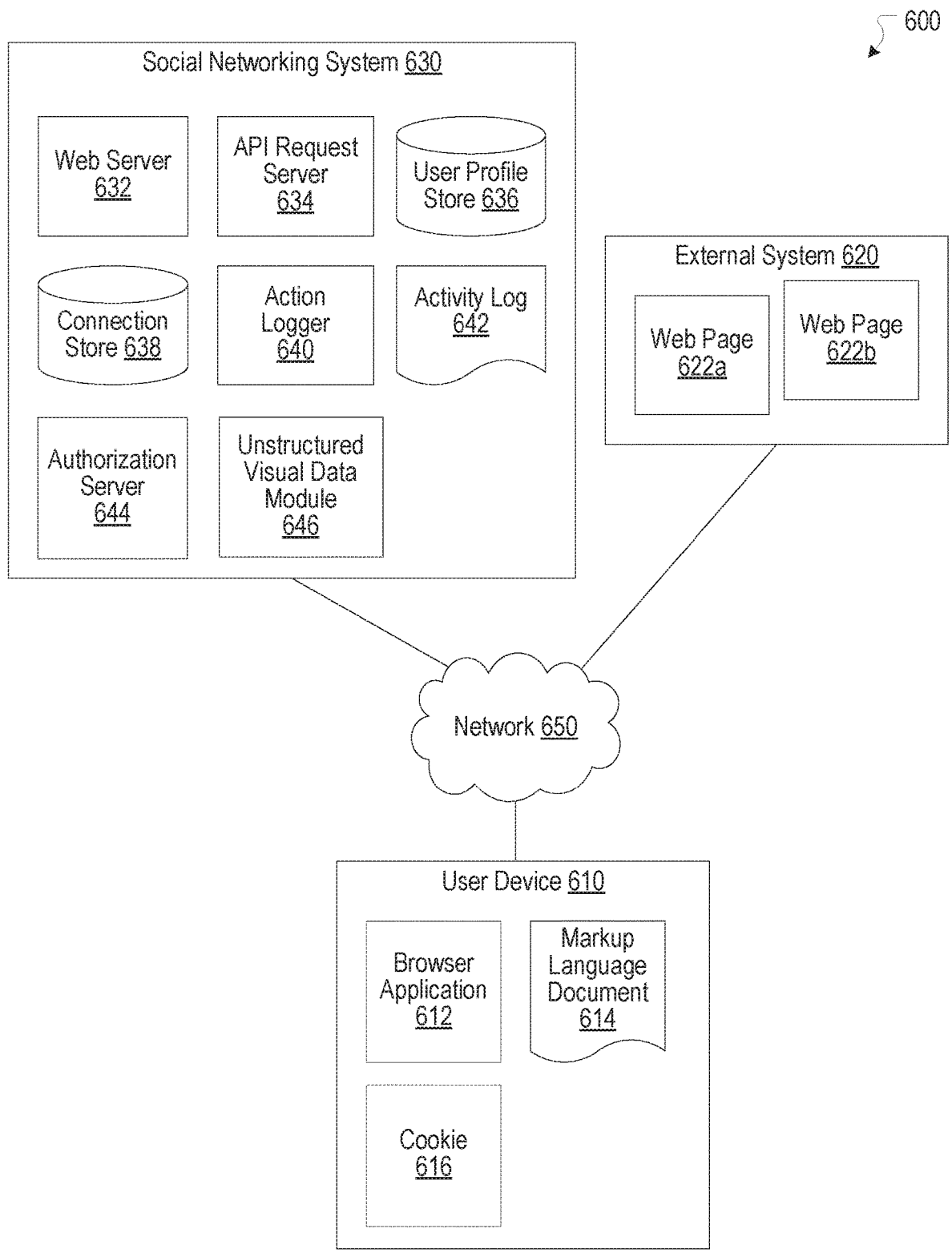
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, according to an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an unstructured visual data module 646. The unstructured visual data module 646 can, for example, be implemented as the unstructured visual data module 102, as discussed in more detail herein. As discussed previously, it should be appreciated that there can be many variations or other possibilities. For example, in some embodiments, one or more functionalities of the unstructured visual data module 646 can be implemented in the user device 610.

Hardware Implementation

Figure 7:
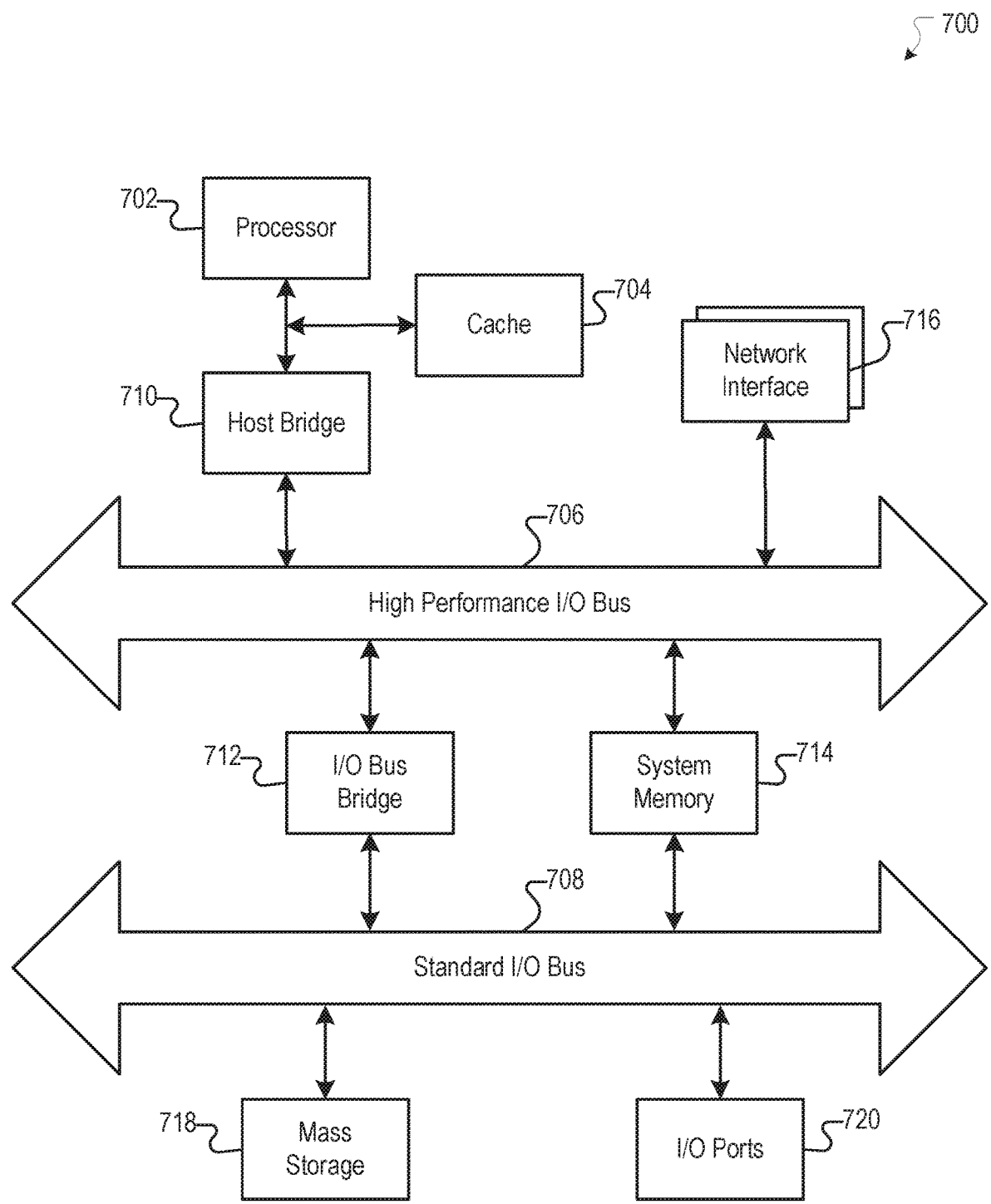
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein according to an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 620, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing system, a user with one or more re-creation recommendations, wherein the one or more re-creation recommendations comprise a first content item that is selected for inclusion in the one or more re-creation recommendations based on the user having previously interacted with the first content item on a system;
receiving, by the computing system, a user selection of the first content item for re-creation; and
providing, by the computing system, guidance for recreating the first content item, the guidance provided through a camera view of surroundings of the user and indicating through the camera view an exact physical location in the surroundings of the user from which the first content item was captured, the exact physical location indicated by a reference presented in the camera view where the user can stand to recreate the first content item.

2. The computer-implemented method of claim 1, wherein the guidance comprises location guidance.

3. The computer-implemented method of claim 2, wherein the providing guidance for recreating the first content item comprises providing location guidance in an augmented reality interface of a camera application.

4. The computer-implemented method of claim 1, wherein the guidance comprises camera orientation guidance.

5. The computer-implemented method of claim 4, wherein the providing guidance for recreating the first content item comprises providing camera orientation guidance in an augmented reality interface of a camera application.

6. The computer-implemented method of claim 5, wherein the providing the camera orientation guidance comprises providing a semi-transparent view of the first content item in the camera application.

7. The computer-implemented method of claim 1, wherein the one or more re-creation recommendations are determined based on social networking system activity by the user.

8. The computer-implemented method of claim 7, wherein the one or more re-creation recommendations are determined based on previous content items liked by the user on the social networking system.

9. The computer-implemented method of claim 1, wherein
each re-creation recommendation of the one or more re-creation recommendations is associated with a particular location, and
each re-creation recommendation of the one or more re-creation recommendations is selected based on a number of content items associated with the particular location associated with the re-creation recommendation.

10. The method of claim 1, wherein camera orientation guidance is provided in response to the user standing at the exact location.

11. A system comprising:
at least one processor; and
a memory storing instructions that, when executed by the at least one processor, cause the system to perform a method comprising:
providing a user with one or more re-creation recommendations, wherein the one or more re-creation recommendations comprise a first content item that is selected for inclusion in the one or more re-creation recommendations based on the user having previously interacted with the first content item on a system;
receiving a user selection of the first content item for re-creation; and
providing guidance for recreating the first content item, the guidance provided through a camera view of surroundings of the user and indicating through the camera view an exact physical location in the surroundings of the user from which the first content item was captured, the exact physical location indicated by a reference presented in the camera view where the user can stand to recreate the first content item.

12. The system of claim 11, wherein the guidance comprises location guidance.

13. The system of claim 12, wherein the providing guidance for recreating the first content item comprises providing location guidance in an augmented reality interface of a camera application.

14. The system of claim 11, wherein the guidance comprises camera orientation guidance.

15. The system of claim 14, wherein the providing guidance for recreating the first content item comprises providing camera orientation guidance in an augmented reality interface of a camera application.

16. A non-transitory computer-readable storage medium including instructions that, when executed by at least one processor of a computing system, cause the computing system to perform a method comprising:
providing a user with one or more re-creation recommendations, wherein the one or more re-creation recommendations comprise a first content item that is selected for inclusion in the one or more re-creation recommendations based on the user having previously interacted with the first content item on a system;
receiving a user selection of the first content item for re-creation; and
providing guidance for recreating the first content item, the guidance provided through a camera view of surroundings of the user and indicating through the camera view an exact physical location in the surroundings of the user from which the first content item was captured, the exact physical location indicated by a reference presented in the camera view.

17. The non-transitory computer-readable storage medium of claim 16, wherein the guidance comprises location guidance.

18. The non-transitory computer-readable storage medium of claim 17, wherein the providing guidance for recreating the first content item comprises providing location guidance in an augmented reality interface of a camera application.

19. The non-transitory computer-readable storage medium of claim 16, wherein the guidance comprises camera orientation guidance.

20. The non-transitory computer-readable storage medium of claim 19, wherein the providing guidance for recreating the first content item comprises providing camera orientation guidance in an augmented reality interface of a camera application.

* * * * *